United States Patent Office 2,931,776
Patented Apr. 5, 1960

2,931,776
DENTURE CLEANSER COMPOSITION
Richard Skipworth Howard, Elloughton, England, assignor to Reckitt & Colman Limited, Hull, Yorkshire, England, a British company
No Drawing. Application August 14, 1956
Serial No. 603,862
Claims priority, application Great Britain
September 1, 1955
5 Claims. (Cl. 252—99)

The invention relates to cleansing compositions, and is particularly concerned with water-soluble cleansing compositions of the oxygenated type.

Such cleansing compositions are well known and may comprise mixtures of hydrated sodium perborate with, for example, trisodium phosphate, sodium carbonate, sodium silicate and/or sodium bicarbonate. Compositions of this type are used particularly for the cleansing of dentures.

In order to obtain a solution which will clean an average set of dentures, approximately two to ten grams of the cleansing composition are usually dissolved in sufficient water to cover the dentures. For purposes of convenience and providing a measured dose, a preparation in tablet form would have distinct advantages, provided the tablets were of a convenient size and readily dispersable and soluble on addition to water. However, if the compositions are compressed into tablets of sufficient mechanical strength to withstand packing, handling and transport, the tablets will after placing in water, either dissolve very slowly or remain substantially undissolved throughout the cleansing period which may vary from a few minutes to overnight.

Attempts have previously been made to overcome slow breakdown and poor solubility in water of such tablets by using the well known technique of incorporating in the mixture before pressing an acid such as tartaric or citric acid and sodium carbonate or bicarbonate which on addition to water react together to give carbon dioxide. This breaks up the tablets and causes self-stirring of the liquid and hence faciliates solution of the ingredients. However, this method has serious disadvantages when used with oxyegnated cleansing compositions since the cleansing properties are impaired and tablets with unsatisfactory storage properties are obtained.

We have now found that by adding an anhydrous perborate to the cleansing compositions before tabletting, tablets are obtained which readily disperse in water with effervescence and hence self-stirring of the solution and provide a solution of substantially the same cleansing efficiency as that prepared without the addition of the anhydrous perborate.

The term "anhydrous perborate" as used in this specification means a perborate which when added to water gives a rapid evolution of oxygen in the form of effervescence. The anhydrous perborate may be prepared by first converting the fully hydrated perborate into the monohydrate form and then further heating the monohydrate form under suitable conditions e.g. at 100° C. in vacuo.

It is an object of the invention to provide a cleansing composition in tablet form which has improved disintegrating and solubility properties on addition to water.

According to the present invention there is provided a tablet for the preparation of an aqueous cleansing solution the tablet comprising a mixture of from 99 to 30% by weight of a water-soluble cleansing composition and from 1 to 70% by weight of an anhydrous alkali metal or alkaline earth metal perborate or anhydrous ammonium perborate. Preferably from 4 to 30% of the anhydrous perborate is employed.

The preferred anhydrous perborate is sodium perborate, the amount of anhydrous sodium perborate depending on the speed of distintegration desired and the size of the tablet. Anhydrous potassium, calcium and magnesium perborate may also be employed.

Following are examples of tabletting compositions according to the invention:

Example I:                                        Parts by weight
   Anhydrous sodium perborate _____ 30
   Soda ash _____ 30
   Sodium perborate monohydrate _____ 35
   Pressing aids _____ 5

Example II:
   Anhydrous sodium perborate _____ 20
   Trisodium phosphate (anhydrous) _____ 50
   Sodium percarbonate _____ 25
   Pressing aids _____ 5

Example III:
   Anhydrous sodium perborate _____ 19
   Sodium perborate monohydrate _____ 29
   Trisodium phosphate (anhydrous) _____ 50
   Perfume _____ 0.25
   Pressing aids _____ 4.75

Example IV:
   Anhydrous calcium perborate _____ 30
   Soda ash _____ 30
   Sodium perborate monohydrate _____ 35
   Pressing aids _____ 5

Example V:
   Anhydrous magnesium perborate _____ 30
   Soda ash _____ 30
   Sodium perborate monohydrate _____ 35
   Pressing aids _____ 5

Example VI:
   Anhydrous ammonium perborate _____ 30
   Soda ash _____ 30
   Sodium perborate monohydrate _____ 35
   Pressing aids _____ 5

Example VII:
   Anhydrous calcium perborate _____ 20
   Trisodium phosphate (anhydrous) _____ 50
   Sodium percarbonate _____ 25
   Pressing aids _____ 5

Example VIII:
   Anhydrous magnesium perborate _____ 20
   Trisodium phosphate (anhydrous) _____ 50
   Sodium percarbonate _____ 25
   Pressing aids _____ 5

Example IX:
   Anhydrous ammonium perborate _____ 20
   Trisodium phosphate (anhydrous) _____ 50
   Sodium percarbonate _____ 25
   Pressing aids _____ 5

Example X:
   Anhydrous calcium perborate _____ 19
   Sodium perborate monohydrate _____ 29
   Trisodium phosphate (anhydrous) _____ 47
   Perfume _____ 0.25
   Pressing aids _____ 4.75

Example XI:
   Anhydrous magnesium perborate _____ 19
   Sodium perborate monohydrate _____ 29
   Trisodium phosphate (anhydrous) _____ 47
   Perfume _____ 0.25
   Pressing aids _____ 4.75

Example XII:
   Anhydrous ammonium perborate _____ 19
   Sodium perborate monohydrate _____ 29
   Trisodium phosphate (anhydrous) _____ 47
   Perfume _____ 0.25
   Pressing aids _____ 4.75

The pressing aids referred to in the above examples comprise lubricants normally used in tabletting, for example talc. The ingredients given in the examples are mixed together and the mixed powder compressed by tabletting. Care must be taken during the manufacture of the tables to avoid undue exposure to the atmosphere of the anhydrous sodium perborate and mixtures containing this substance owing to its hygroscopic nature. Moreover, well-stoppered containers or other suitable protective packs are desirable to prevent any damage to the product before use.

The weight of a single tablet required to give effective cleansing solutions from the compositions varies from approximately two to twelve grams. However, if desired several smaller tablets may be used.

Instead of using a form of perborate which has been substantially completely converted to the anhydrous form by treatment of the monohydrate form of the perborate, it is also possible to use a form in which a lower degree of conversion of the monohydrate to anhydrous form has been attained, but in this case larger quantities are required to give the same effect as that given by the substantially anhydrous form.

When the tablets are placed in water the anhydrous perborate decomposes with evolution of oxygen. The resulting effervescence causes the tablets to disintegrate and dissolve rapidly.

I claim:

1. A tablet for the preparation of an aqueous cleansing solution, said tablet consisting essentially of a mixture of an inorganic persalt which slowly releases active oxygen in aqueous solution selected from the group consisting of a percarbonate and a hydrated perborate and at least one alkaline alkali metal inorganic detergent salt with from about 4 to about 30% by weight of a compound selected from the group consisting of the anhydrous forms of sodium, potassium, ammonium, calcium and magnesium perborates which on addition to water effervesce and rapidly release gaseous oxygen.

2. The tablet of claim 1 wherein said anhydrous perborate is anhydrous sodium perborate.

3. The tablet of claim 1 wherein said anhydrous perborate is anhydrous ammonium perborate.

4. The tablet of claim 1 wherein said anhydrous perborate is anhydrous calcium perborate.

5. The tablet of claim 1 wherein said anhydrous perborate is anhydrous magnesium perborate.

References Cited in the file of this patent

UNITED STATES PATENTS

| | | |
|---|---|---|
| 1,628,015 | Welsher | May 10, 1927 |
| 1,677,283 | Jones | July 17, 1928 |
| 2,152,520 | Lind | Mar. 28, 1939 |
| 2,498,343 | Rider et al. | Feb. 21, 1950 |
| 2,498,344 | Rider et al. | Feb. 21, 1950 |
| 2,607,738 | Hardy | Aug. 19, 1952 |
| 2,706,178 | Young | Apr. 12, 1955 |

FOREIGN PATENTS

| | | |
|---|---|---|
| 22,580 of 1903 | Great Britain | Feb. 11, 1904 |

OTHER REFERENCES

Comprehensive Treatise on Inorganic and Theoretical Chemistry, by Mellor, vol. V, pp. 115–118 (1924), pub. by Longmans, Green & Co., London.